United States Patent Office 3,632,662
Patented Jan. 4, 1972

3,632,662
DEHYDROGENATION PROCESS
David R. Dyroff, Creve Coeur, and Dennis A. Ruest, St. Louis, Mo., assignors to Monsanto Company, St. Louis, Mo.
No Drawing. Filed Mar. 26, 1970, Ser. No. 23,053
Int. Cl. C07c 5/20
U.S. Cl. 260—683.3    5 Claims

ABSTRACT OF THE DISCLOSURE

In catalytic dehydrogenation of paraffins, catalyst activity is maintained relatively constant within a desired range by utilizing a hydrogen sulfide poisoned catalyst of platinum or palladium and a Group I-B metal and gradually removing poison from the catalyst during the dehydrogenation reaction.

BACKGROUND OF THE INVENTION

This invention relates to an improved process for producing mono-olefins by catalytic dehydrogenation of corresponding saturated hydrocarbons. More particularly, this invention relates to processes for dehydrogenating linear paraffins containing from about 6 to 20 carbon atoms to yield corresponding mono-olefins useful as intermediates in the production of detergent alkylates and in other applications.

Processes for the dehydrogenation of paraffins in the presence of catalysts comprising a noble metal such as platinum or palladium deposited on a support such as alumina or silica are well-known. In continuous dehydrogenation reactions utilizing such catalysts, only a fraction of the paraffins are converted to mono-olefins and, as the processing is continued, the proportion of paraffins converted continuously decreases as a result of a continuous decline in catalyst activity (resulting from deposition of coke on the catalyst and possibly other causes) until the degree of conversion achieved is so low as to require replenishment or regeneration of the catalyst in order to effect economical operation. Further, during the early stages of the dehydrogenation reaction when catalyst activity is high, substantial amounts of undesired by-products, e.g., diolefins, triolefins and aromatics are formed in addition to the desired mono-olefins. Substantial increases in the formation of these undesired by-products are observed when attempts are made to increase paraffin conversion by increasing contact time between the paraffins and catalysts, thereby limiting the use of such techniques as a practical means of increasing mono-olefin production. Thus, it is seen that during the dehydrogenation reaction the catalyst activity varies so that during a substantial portion of the reaction by-product formation is undesirably high or paraffin conversion is undesirably low. Only during a relatively brief portion of a continuous dehydrogenation reaction is catalyst activity at an optimum so as to produce acceptable conversion of the paraffin with minimum formation of undesired by-products.

SUMMARY OF THE INVENTION

It is an object of this invention to provide improved processes for continuous catalytic dehydrogenation of paraffins to yield corresponding mono-olefins characterized by an extended period of optimized catalyst activity providing an acceptable degree of conversion with minimum concurrent production of undesired by-products.

Basically, the invention involves poisoning the catalyst to reduce the catalytic activity thereof so as to obtain desirably high rates of conversion of paraffins to mono-olefins with minimum formation of by-products, and continuously reducing the degree of poisoning of such catalyst to compensate for other factors such as coke deposition which normally results in a decline in catalyst activity, thereby maintaining the catalyst activity relatively constant within the desired range. The invention will be better understood from the following description of the preferred embodiments.

DESCRIPTION OF THE PREFERRED EMBODIMENTS

In the process of this invention, saturated hydrocarbons are dehydrogenated to the corresponding mono-olefins by contacting such hydrocarbons under dehydrogenation conditions with a catalyst comprising a noble metal or noble metal oxide deposited on an inert support, such catalyst being poisoned by a quantity of poison sufficient to substantially reduce the dehydrogenation activity thereof and gradually removing the poison from the dehydrogenation catalyst during the dehydrogenation reaction.

Although the process of this invention can be advantageously employed to effect dehydrogenation of any saturated hydrocarbon, it is particularly useful in conjunction with the dehydrogenation of linear paraffins containing from 6 to 20 carbon atoms, preferably 9 to 15 carbon atoms, to yield mono-olefins useful as intermediates in the formation of detergent alkylates.

Any catalyst of the type comprising noble metals, e.g., platinum or palladium, deposited on inert supports, e.g., alumina or silica, such as are commonly employed in dehydrogenation reactions can be utilized in the practice of this invention. Desirably, the catalyst can be nonacid in character, and, to this end, may contain from about 0.01 to 10% by weight alkali metal in the catalyst support. Various metallic modifiers such as copper, silver, or iron may, in some instances, be advantageously employed. A particularly preferred catalyst is one comprising from about 0.002% to 50% by weight of a Group I-B metal (preferably copper) or metal oxide (preferably copper oxide) or mixtures of such metals and/or oxides and from about 0.005% to 5% of a noble metal or noble metal oxide of the platinum or palladium families or mixtures thereof, deposited on an alumina support having a surface area of at least 10 square meters per gram, a macropore volume of at least 0.05 cc. per gram and an acidity factor not in excess of 2.

The acidity factor is determined by placing the alumina support material prior to the time that any metal or metal oxide has been deposited upon its surface in a reactor at a temperature of 435° C. to 440° C. while passing through the reactor and into contact with the alumina a hydrocarbon mixture of 92 weight percent n-dodecane and 8 weight percent n-α-dodecene admixed with hydrogen in a mole ratio of 2 parts hydrogen to one part hydrocarbon mixture. The hydrocarbon-hydrogen mixture should be passed oved the alumina base under a pressure of one atmosphere ±2 pounds per square inch and at a space velocity of 4.65 LHSV. The hydrocarbon mixture after being passed over the alumina support material is then passed through a gas chromatograph in which the chromatographic column is packed with a substrate for separating the mixture according to boiling point and polarity. 1% by weight $AgNO_3$ plus 18% by weight Carbowax 20M polyethylene glycol on Chromasorb W diatomaceous earth is a suitable and preferred substrate. The numerical value of the weight percent material, based on the total weight of the hydrocarbon mixture introduced to the column, which is eluted from the column prior to n-dodecane represents the acidity factor as this term is employed herein. As previously mentioned, the acidity factor should be not greater than 2.0 and preferably not in excess of 1.0.

The term "macropore volume" refers to the total volume of pores having a radius greater than 350 A per unit weight of alumina and is measured using an Aminco-Winslow mercury porosimeter, model 5-7107 (American Instrument Company), or equivalent apparatus to determine the internal volume penetrated between 0 to 2500 p.s.i.g.

Catalyst of this type and other catalysts suitable for use in this invention and the use of such catalysts in dehydrogenation reactions are described in detail in U.S. patent application Ser. No. 715,133 filed Mar. 22, 1968 and U.S. patent application Ser. No. 860,418 filed Sept. 23, 1969, both of said applications copending herewith and having a common assignee and in U.S. Pats. Nos. 3,432,-567; 3,312,734; 3,435,090; 3,315,008; 3,315,007; and 3,274,287, the disclosures of the foregoing applications and patents being incorporated herein by reference.

In the process of this invention, the poisons used in conjunction with the foregoing catalysts must not only be capable of reducing the dehydrogenation activity of the catalyst, but must also be removable from the catalyst under normal dehydrogenation conditions. (Complete removability of poison is not necessary, but at least 25% of the poison should be removable to provide the desired advantages.) Catalyst poisons suitable for use in conjunction with selected catalysts of the foregoing types include hydrogen sulfide; carbon disulfide; organic amines (this term being limited to organic compounds containing 1 or more amine functional groups in combination with saturated or unsaturated hydrocarbon groups but containing no other functional groups) such as aniline, 2-amino pyridine, pyrrolidine, and hexamethylene diamine; mercaptans (this term being limited to organic compounds containing one or more —SH groups in combination with various saturated or unsaturated hydrocarbon groups, but containing no other functional groups) such as thiophenol or 1-dodecanethiole; organic sulfides (this term is used to define organic sulfur compounds other than thiophene derivatives containing a "—S—" group or groups in combination with various saturated or unsaturated hydrocarbon groups but having no other functional groups present) such as thioanisole and; compounds containing thiophene and/or thiazole moieties such as thiophene, benzothiophene, and benzothiazole. In the case of the particularly preferred Cu–Pt promoted catalysts described above, the use of hydrogen sulfide as a poison is particularly preferred. With regard to the organic sulfur containing compounds, it is observed that as the molecular weight of a particular class of poisons increases, the rapidity with which the poison is removed from the catalyst under normal dehydrogenation conditions decreases.

Poisoning of the catalyst is effected simply by contacting the catalyst with the poison. A particularly convenient technique is to introduce the poison into a stream of paraffins to be dehydrogenated and contact the poison laden paraffins with the catalyst under dehydrogenation conditions. In the case of gaseous poisons, e.g., $H_2S$, another convenient technique is to introduce the poison mixed with hydrogen as a carrier. Since passing a paraffin stream in contact with poisoned catalyst under dehydrogenation conditions gradually removes poison from the catalyst, the concentration of poison in the paraffin stream must be sufficiently high to deposit poison at a rate exceeding the rate of poison removal. When the dehydrogenation activity of the catalyst has been reduced to the desired level, the poison content of the paraffin feed stream is eliminated (or reduced as hereinafter explained).

The dehydrogenation conditions in terms of temperature, pressure, relative feed rates and catalyst volume, etc., are conventional and selected in accordance with considerations well understood by those skilled in the art of catalytic dehydrogenation. During the dehydrogenation reaction, poison is gradually removed from the catalyst, tending to increase the dehydrogenation activity thereof. This effect, however, tends to be counter-balanced by a normal gradual decline in catalyst activity resulting, for example, from deposition of coke on the catalyst. Thus, in the process of this invention, these counter-effects maintain catalyst activity in a relatively narrow range until most of the poison is removed from the catalyst, after which the catalyst activity declines in a normal manner until replacement or regeneration is required.

Preferably, the catalyst activity can be maintained within a relatively narrow range by selecting a catalyst-poison combination such that the rate of poison removal under given dehydrogenation conditions corresponds to the normal rate of decline in catalyst activity. Alternatively, when the combination of poison-catalyst-dehydrogenation conditions is such that poison is removed more rapidly than required to compensate for normal catalyst activity decline; poison can be introduced into the paraffin feed to reduce the rate of poison removal from the catalyst.

The practice of the invention is further illustrated by the following examples.

EXAMPLES I-XIV

Six grams of catalyst −10+14 U.S. standard sieve size and comprising 2% copper and 0.45% platinum (by weight) deposited on an alumina support having an acidity factor of 0.1 (contains about 0.3% sodium in combined form), a macropore volume of about 0.18 cc. per gram, and a surface area of about 190 square meters per gram are used in each of Examples I-XIV. In each example, the catalyst is maintained as a fixed bed in a flow-through dehydrogenation reactor at a temperature of about 452° C. The catalyst is poisoned by feeding 50 grams of benzene containing the amount of poison (shown as percent by weight S or N) indicated in Table 1 below. Linear dodecane is fed through the reactor along with some hydrogen for 6 hours, the ratio of catalyst weight in grams to dodecane flow rate in moles per hour being 5.7 gm. hr./mole. The ratio of hydrogen to hydrocarbon in the reactor is 2, and the reactor pressure is 4 p.s.i.g. The product is analyzed by gas-liquid chromatography and the results are reported in Table 1. No calibration or correction is applied to the GLC peak areas, so that the indicated percentages are relative only. However, this method is applied consistently to all runs and thus comparisons among runs are valid.

TABLE 1

| Example | Poison | Poison in benzene is Percent N or percent S | Percent dodecane converted to— | | | Mono-olefin yield as percent of paraffins converted |
|---|---|---|---|---|---|---|
| | | | Lighter hydrocarbons | Diolefins, triolefins, aromatics | Mono-olefins | |
| I | None | | 0.99 | 4.7 | 18.8 | 76.9 |
| II | Thiophene | 0.1 | 0.09 | 1.7 | 12.4 | 87.3 |
| III | Benzothiophene | 0.1 | 0.06 | 1.2 | 10.1 | 88.6 |
| IV | Benzothiazole | 0.1 | 0.03 | 0.7 | 8.6 | 92.3 |
| V | Thioanisole | 0.1 | 0.07 | 1.3 | 10.7 | 88.9 |
| VI | Thiophenol | 0.1 | 0.06 | 1.1 | 10.4 | 89.9 |
| VII | 1-dodecanethiol | 0.1 | 0.07 | 1.2 | 10.8 | 89.3 |
| VIII | Carbon disulfide | 0.1 | 0.06 | 1.2 | 11.1 | 90.0 |
| IX | Hydrogen sulfide | 0.1 | 0.08 | 1.2 | 11.3 | 90.3 |
| X | Quinoline | 1.0 | 0.16 | 3.1 | 18.3 | 85.0 |
| XI | Pyrolidine | 1.0 | 0.12 | 2.1 | 17.3 | 88.7 |
| XII | Aniline | 1.0 | 0.24 | 3.6 | 19.6 | 83.6 |
| XIII | 2-aminopyridine | 1.0 | 0.21 | 3.1 | 18.9 | 85.2 |
| XIV | Hexamethylenediamine | 1.0 | 0.08 | 0.9 | 13.2 | 92.9 |

It is seen from the foregoing examples that the use of catalyst poisons in accordance with this invention substantially improves catalytic dehydrogenation of paraffins.

What is claimed is:

1. In a continuous process of preparing linear monoolefins having chain lengths of from 6 to 20 carbon atoms by contacting corresponding linear paraffins under dehydrogenation conditions with a dehydrogenation catalyst comprising from 0.002% to 50% by weight of a first metallic component selected from the group consisting of Group I-B metals, oxides thereof, and mixtures thereof and from 0.005% to 5% by weight of a second metallic component selected from the group consisting of platinum, palladium, oxides thereof and mixtures thereof deposited on the surface of an alumina catalyst support material having an acidity factor not in excess of 2.0, a macropore volume of at least 0.05 cubic centimeters per gram and a surface area of at least 10 square meters per gram the improvement wherein said catalyst is poisoned with a dehydrogenation activity reducing quantity of poison selected from the group consisting of hydrogen sulfide, carbon disulfide, mercaptans, organic sulfides, compounds containing thiophene moieties, compounds containing thiozole moieties, and organic amines, and further comprising the step of gradually removing said poison from the dehydrogenation catalyst during the dehydrogenation reaction.

2. The process of claim 1 wherein the poison is hydrogen sulfide.

3. The process of claim 2 wherein said first metallic component is copper and said second metallic component is platinum.

4. The process of claim 3 wherein the portion is removed from the catalyst at a rate correlated with the rate of normal decline in catalyst activity so as to maintain a substantially constant level of catalyst activity.

5. The process of claim 4 wherein the catalyst is contacted with additional poison during the dehydrogenation reaction.

References Cited

UNITED STATES PATENTS

| | | | |
|---|---|---|---|
| 2,131,089 | 9/1938 | Beeck et al. | 260—683.3 |
| 3,439,061 | 4/1969 | Henderson et al. | 260—683.3 |
| 2,604,438 | 7/1952 | Bannerot | 260—683.3 |
| 3,067,130 | 12/1962 | Baldwin, Jr., et al. | 260—683.3 |
| 3,274,287 | 9/1966 | Moore et al. | 260—683.3 |
| 3,291,855 | 12/1966 | Haensel | 260—683.3 |
| 3,437,585 | 4/1969 | Kuchar | 260—683.3 |

DELBERT E. GANTZ, Primary Examiner

V. O'KEEFE, Assistant Examiner

PO-1050
(5/69)

UNITED STATES PATENT OFFICE
CERTIFICATE OF CORRECTION

Patent No. 3,632,662      Dated January 4, 1972

Inventor(s) David R. Dyroff and Dennis A. Ruest

It is certified that error appears in the above-identified patent and that said Letters Patent are hereby corrected as shown below:

Column 6, line 25, the word "portion" should be -- poison --.

Signed and sealed this 13th day of June 1972.

(SEAL)
Attest:

EDWARD M. FLETCHER, JR.
Attesting Officer

ROBERT GOTTSCHALK
Commissioner of Patents